Patented June 26, 1945

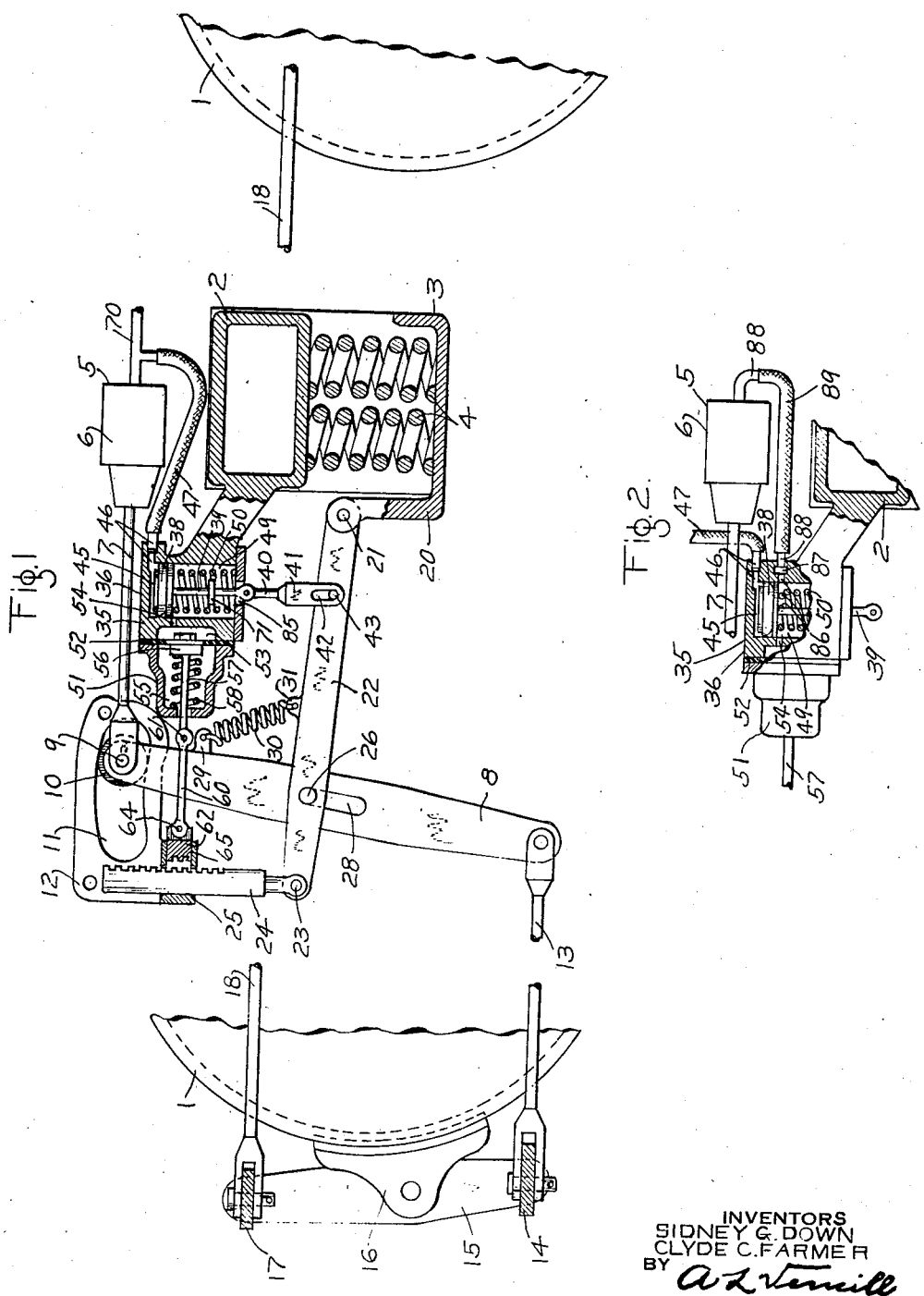

2,379,285

UNITED STATES PATENT OFFICE 2,379,285

VARIABLE LOAD BRAKE

Sidney G. Down, Edgewood, and Clyde C. Farmer, Pittsburgh, Pa., assignors to The Westinghouse Air Brake Company, Wilmerding, Pa., a corporation of Pennsylvania Application November 3, 1942, Serial No. 464,346

16 Claims. (Cl. 188—195)

This invention relates to railway vehicle brake apparatus and more particularly to variable load brake rigging of the type in which the leverage may be automatically varied in accordance with variations in the weight of the load on the vehicle to correspondingly vary the force with which the brake is adapted to be applied.

An object of the invention is to provide an improved variable load brake apparatus of the above mentioned type.

Another object of the invention is to provide a variable load brake rigging of the above mentioned type which is so constructed and arranged that it will be automatically conditioned or changed over for either empty or load braking by fluid under pressure from the usual fluid pressure operated brake cylinder upon initiating an application of the brakes.

A further object of the invention is to provide automatically operative means for automatically and positively locking the rigging in any of its conditioned positions when initiating an application of the brakes and for automatically unlocking the rigging when effecting a release of the brakes.

Other objects and advantages will appear in the following detailed description.

In the accompanying drawing Fig. 1 is a fragmentary diagrammatic vertical sectional view taken longitudinally of a railway vehicle truck embodying the invention, parts of the truck and of the brake rigging, not necessary for a clear understanding of the invention, being omitted. Fig. 2 is a fragmentary diagrammatic vertical sectional view of a portion of the railway vehicle truck shown in Fig. 1 and of a modified brake conditioning means which may be employed in lieu of the conditioning means shown in Fig. 1.

In Fig. 1 of the drawing, the variable load brake rigging is shown applied to a railway vehicle truck which may be of the usual well known construction having longitudinally spaced wheel and axle assemblies 1, only the wheels of which are shown, a truck bolster 2, laterally spaced side frames (not shown) which are rigidly carried in the usual manner by the wheel assemblies and a laterally extending spring plank 3 which is carried by the truck side frames and upon which the usual truck bolster supporting springs 4 seat.

The brake rigging comprises a brake cylinder 5 of the usual well known type having a cylinder 6 which is mounted on an unsprung part of the vehicle such as a truck side frame and which contains the usual piston (not shown) having a push rod 7 which projects beyond one end of the cylinders. The outer end of the push rod 7 is operatively connected to one end of a vertically disposed brake cylinder lever 8 by means of a pin 9.

The pin 9, in addition to connecting the adjacent ends of lever 8 and push rod 7 together, also carries a roller 10 which is adapted to travel in a guide slot 11 provided in a bracket 12 carried by an unsprung part of the vehicle, such for example as a truck side frame, thus the bracket supports the lever.

The opposite end of the brake cylinder lever 8 is operatively connected to one end of a longitudinally extending pull rod 13. The opposite end of this pull rod is connected to a transversely extending bar 14 which is operatively connected at each end with one end of a vertically disposed live lever 15 preferably arranged in the plane of the tread of the adjacent wheel of the wheel assembly at one end of the truck. Each live lever 15 has operatively connected thereto, intermediate its ends, a brake shoe 16 which is adapted to be moved into and out of frictional braking engagement with a wheel. The opposite ends of the live levers 15 may be operatively connected together by means of a laterally extending bar 17.

Beyond the wheel assembly at the other end of the truck the brake rigging may comprise a pair of vertically disposed dead brake levers which may be arranged in the plane of the tread of a wheel of the assembly, which levers may be fulcrumed at one end to the truck frames, and which may be operatively connected together at their opposite ends by means of transversely extending bars which may correspond to the bars 14 and 17. Each brake lever has operatively connected thereto, intermediate its ends, a brake shoe for engagement with the adjacent wheel. This arrangement of brake levers, brake beams and brake shoes is so well known in the brake art that an illustration thereof is deemed unnecessary.

The transversely extending bars at this end of the truck are operatively connected together by means of laterally spaced longitudinally extending pull rods 18, only one of which rods is shown.

Rigidly attached to the spring plank 3 and extending upwardly from one side thereof is a bracket 20 which carries a pin 21 upon which is pivotally mounted the inner end of a fulcrum lever 22. The opposite end of the lever 22 is connected by means of a pin 23 to one end of a vertically disposed upwardly extending serrated or toothed locking bar 24 which is slidably guided in a portion 25 carried by the bracket 12.

The fulcrum lever 22 adjacent the outer end thereof carries a pin 26 which pin passes through a slotted opening 28 formed in the brake cylinder lever 8 intermediate its ends, which pin serves as a fulcrum for the brake cylinder lever 8, the slotted opening extending longitudinally of the brake cylinder lever.

At one side of the pin 26 the brake cylinder lever 8 is provided with a lug 29 to which one end of a coil spring 30 is secured. The opposite end of the spring 30 is connected to a lug 31 which projects upwardly from the fulcrum lever 27. This spring, at all times, biases the lever 22 and thereby the pin 23 toward its uppermost position in the slotted opening 28.

For shifting the lever 22 and thereby the pin 26 relative to brake cylinder lever 8 within the slotted opening 28, so as to provide a higher leverage ratio for a loaded car than for an empty car, and for maintaining the lever and thereby the pin in its adjusted position, a combined adjusting and locking mechanism 35 is provided.

The combined adjusting and locking mechanism 35 comprises a body portion 36 which may be carried in any suitable manner by the truck bolster 2. Contained in this body portion is a piston 38 having a stem 39 which extends to the exterior of the casing. The piston stem 39 is slidably associated with the fulcrum lever 22 by means of a link 40 which is pivotally connected to the stem and which has at its lower end a jaw portion 41 provided with slotted openings 42 through which a pin 43 carried by the lever passes.

At one side of the piston 38 there is a chamber 45 which is in constant open communication with a passage and pipe 46, which pipe is connected to a flexible hose 47 leading to the brake cylinder pipe 70 which may be rigidly attached to the brake cylinder and truck frame. The flexible hose is provided for the purpose of accommodating relative movement between the pipe 70 and the truck bolster.

At the opposite side of the piston 38 there is a chamber 49 and contained in this chamber and interposed between the piston and the lower inner wall of the chamber is a spring 50, which tends, at all times, to urge the piston 38, stem 39 and connected link 40 in a direction away from the lever 22.

Clamped between the body portion 36 and a cap portion 51 is a flexible diaphragm 52. At one side of this diaphragm there is a chamber 53 which is normally connected through a passage 54 in a wall of the body portion 36 to the chamber 49.

At the opposite side of the diaphragm there is a chamber 55. Contained in this chamber and secured in any suitable manner to the diaphragm is a diaphragm follower 56 having a stem 57 which extends to the exterior of the cap portion 51. Also contained in chamber 55 and interposed between the diaphragm follower 52 and the inner wall of the cap portion is a spring 58 which tends, at all times, to urge the diaphragm 52 in a direction toward the body portion 36 and thereby biases the diaphragm follower 56 and connected stem 57 in the same direction.

The outer end of the stem 57 is pivotally connected to one end of a link member 60 by means of a pin 61, which link, at its opposite end, is pivotally connected to a slidably mounted locking member 62 by means of a pin 64. This slidably mounted locking member 62 is provided with teeth 65 which are adapted to be moved into and out of locking engagement with the teeth of the locking bar 24 hereinbefore mentioned.

It is obvious that any variation in the position of the fulcrum pin 26 with relation to the brake cylinder lever 8 within the slotted opening 28 will result in a variation in the leverage of the brake rigging and thereby a variation in the braking power of the brake rigging.

If the fulcrum pin 26 is moved longitudinally of the lever in a direction away from the brake cylinder push rod 7 the arm of the brake cylinder lever 8 to which the push rod is connected, will be correspondingly lengthened in effect so that when the brake cylinder is operated the power transmitted by the opposite end of the lever to the pull rod 13 will be correspondingly increased. If the pin is moved in the direction toward the push rod 7 the effective length of the arm is reduced and as a consequence power transmitted from the lever to the pull rod will be decreased.

*Operation*

Assuming the vehicle, embodying the invention, to be empty and the brakes on the vehicle released. Under these conditions the several parts of the apparatus will be in the position illustrated in Fig. 1 of the drawing and as a consequence the rigging will be in position for empty braking.

When it is desired to effect an application of the brakes fluid under pressure is supplied in the usual well known manner to a brake cylinder pipe 70 which pipe is connected to the brake cylinder 5. Fluid under pressure supplied to pipe 70 flows therefrom to the brake cylinder 5 and also to the chamber 45 in the combined adjusting and locking mechanism 35 by way of the hose 47 and connected pipe and passage 46. Fluid under pressure thus supplied to chamber 45 and acting on piston 38 in opposition to spring 50 causes the piston to move in a downwardly direction, from the position in which it is viewed in the drawing.

The piston as it thus moves causes the piston stem 39 and connected link 40 to move in the same direction, the link 40, by reason of the slotted opening 42 in the link, moving relative to the pin 43. This downward movement of the piston, stem and link, continues until brought to a stop by a stop member 71, carried by the stem, engaging the casing.

It should here be understood that when the vehicle is empty, the truck bolster 2 will be in its normal or uppermost position as shown, so that when an application of the brakes is initiated and fluid under pressure is supplied to chamber 45 in the manner above described, the piston 38 can move its full stroke, i. e., to the position just described, before the pin 43 carried by the lever 22 will engage the upper end of the slot 42 in the link 40. From this it will be seen, that when the vehicle is empty, operation of the piston 38 will not effect movement of the lever 22 and, the spring 30 will act to maintain the lever 22 and thereby the fulcrum pin 26 in the position shown.

It should here be mentioned that the spring 50 opposing downward movement of piston 38 has a low pressure value, thus a slight increase in fluid under pressure in chamber 45 will cause the piston, piston stem and link to move downwardly and that this downward movement will occur before any appreciable brake cylinder pressure has been developed in the brake cylinder.

When the piston 38 is brought to a stop by the stop member 71 engaging the casing, the piston will have moved to a position where the upper face thereof is just below the passage 54. With the piston in this position, the passage 54 will establish communication between chamber 45 and 53 so that fluid under pressure in chamber 45 will flow by way of passage 54 to chamber 53.

Fluid under pressure thus supplied to chamber 53 and acting on diaphragm 52 will cause the diaphragm to flex in a direction toward the left-hand, as viewed in the drawing, against the opposing pressure of the spring 58. Flexing of the diaphragm in this direction will cause the diaphragm follower 56, stem 57, and link 60 to move in the same direction thereby causing the connected locking portion 62 to move so that the teeth 65 thereof interlock with the teeth of the bar 24, thus locking the bar 24, and lever 22 and thereby the fulcrum pin 26 in position at the upper end of the slotted opening 28 in the brake cylinder lever 8 until such time as the brake cylinder pressure is again depleted of fluid under pressure. It should here be mentioned that the spring 58 is of such a value that it will yield to the power transmitted by the diaphragm before the pressure of fluid in the brake cylinder device is sufficiently high to effect movement of the brake cylinder push rod in its brake applying direction.

After the mechanism has been locked as just described pressure of fluid in the brake cylinder will continue to be increased so as to cause the brake cylinder to function to operate the brake cylinder lever 8 and thereby the operatively associated connected levers and rods of the brake rigging to move the brake shoes 16 into braking engagement with the treads of the truck wheels.

To initiate a release of the brakes, fluid under pressure is vented from the brake cylinder device to the atmosphere by way of pipe 70 in the usual manner causing the brake cylinder device and the connected brake cylinder lever 8 to operate in the usual well known manner to effect a release of the brakes.

As the pressure of fluid in pipe 70 is reduced in effecting a release of the brakes the fluid under pressure in chamber 45 and connected chamber 53 of the combined adjusting and locking mechanism 35 is reduced by way of pipe and passage 46 and flexible hose 47. When after the pressure of fluid in pipe 70 and in the brake cylinder device has been reduced sufficiently to effect the release of the brakes, the pressure in chamber 53 reduces to a slight degree below the opposing pressure of the spring 58, the spring acting through the medium of the diaphragm follower 56, follower stem 57 and link 60 will move the locking member 65 out of locking engagement with the toothed locking bar 24 thus unlocking the lever 22 and thereby fulcrum pin 26. When the pressure in chamber 45 has been reduced sufficiently the spring 50 will act to return the piston 38 stem 39 and link 40 to the position in which they are shown in the drawing. It will here be noted that when the piston 38 returns to the position shown in the drawing the passage 54 will establish communication between chambers 53 and 49, which latter chamber is connected to the atmosphere by way of a passage 35 surrounding stem 39. With the piston thus positioned the final release of fluid under pressure from chamber 53 to the atmosphere is by way of passage 54, chamber 49, and passage 85.

Assuming now that, while the brakes are released lading is placed on the body of the vehicle. Under the influence of the additional weight which the lading imposes on the truck bolster 2 of each truck, the bolster springs 4 will yield and permit the bolster to move downwardly relative to the spring plank 3 and the truck frames (not shown).

Since the combined adjusting and locking mechanism 35 is carried by the bolster it will move bodily with the bolster relative to the spring plank. Upon such movement the piston 38 stem 39 and link 40 comprising a part thereof are caused to move relative to the pin 43 carried by the lever 22, such movement being accommodated by the slot 42 in the link 40. As this movement continues the clearance between the upper end of the slot 42 and the pin 43 is reduced to a degree proportionate to the load imposed on the body of the vehicle.

Now when an application of the brakes is initiated the piston 38, stem 39, and link 40 will be caused to move downwardly to the stopped position in the same manner as hereinbefore described in connection with empty vehicle braking. Since the clearance between the end of the slot 42 and the pin 43 has been reduced due to relative movement between the bolster and the spring plank, downward movement of the piston will cause the pin 42 to engage the upper end of the slot 42 in the link 40 before the piston completes its full travel. Now after the pin 43 engages the upper end of the slot in the link 40 continued movement of the piston in this direction causes the lever 22 to rock about the pivot pin 21 in a counter-clockwise direction. As the lever 22 rocks in this direction it carries the fulcrum pin 26 and locking bar 24 with it thereby automatically adjusting the pin 26 relative to the brake cylinder lever 7 to provide for the degree of braking called for by the weight of the lading carried by the vehicle.

When the piston 38 has completed its travel the proper adjustment will have been made and the piston will again be in a position to establish communication between chambers 45 and 53 so that the combined adjusting and locking mechanism caused to shift the fulcrum pin 26 to its adjusted position and to lock it in this position in the same manner as before described in connection with empty braking.

As the fluid under pressure in the brake cylinder 5 is increased, the device will function in the same manner as already described in connection with empty braking to effect an application of the brakes on the vehicle.

When it is desired to effect a release of the brakes fluid under pressure is vented from the brake cylinder pipe 70 and as a consequence the brakes are released and the fulcrum pin 26 returned to the position in which it is maintained by the weight of the load carried by the vehicle in identically the same manner as hereinbefore described in connection with a release of the brakes on an empty vehicle.

*Description of combined adjusting and locking mechanism shown in Fig. 2*

In Fig. 2 there is shown another form of combined adjusting and locking mechanism which may be substituted for the combined adjusting and locking mechanism shown in Fig. 1. This form of the mechanism is similar to that shown in Fig. 1 except that it is so constructed and arranged that when a brake application is initiated the load adjustment will be made before any fluid under pressure is supplied to the brake cylinder.

As shown in Fig. 2 of the drawing this mechanism is substantially the same as the mechanism shown in Fig. 1 and like parts in both mechanisms are identified by like numerals. The only difference in construction lies in the provision of means for interlocking of the brake cylinder device and the brake cylinder supply and release pipe 70 through the combined adjusting and locking mechanism. To accomplish such interlocking there is provided a series of ports 86 which extend from the interior of the body portion 36 to a passage 87 formed in the wall thereof, which latter passage is connected through pipes 88 and a flexible hose 89 to the brake cylinder device.

In the manner of arrangement it will be noted that the brake cylinder supply and release pipe 70 is connected only to chamber 45 in the adjusting mechanism by way of the flexible hose 47 and pipe 46 and that the brake cylinder 5 is isolated from such pipe 70 while the brakes are released.

*Operation of the combined adjusting and locking mechanism shown in Fig. 2*

From the foregoing description of the mechanism shown in Fig. 1 it will be understood that a slight increase in the pressure of fluid in the brake cylinder supply and release pipe 70 and consequently in the chamber 45 of the adjusting mechanism will cause the piston 38 to move downwardly to its stopped position. It will also be understood that movement of piston 38 to this stopped position will adjust the fulcrum pin 26 relative to the brake cylinder lever 7 to provide for the degree of braking called for by the weight of the lading carried by the vehicle.

When the piston 38 in this form of the adjusting mechanism has been moved to its lowermost or stopped position, the upper face of the piston will be brought to a stop, just below the ports 86 and the passage 54. With the piston in this position, communication will be established between chambers 45 and 53 and also between chamber 45 and the brake cylinder 5, the communication between chambers being made by way of passage 54 and between chamber 45 and the brake cylinder by way of ports 86, passage 87, pipes 88 and hose 89.

With the communication between chambers 45 and 53 thus established fluid under pressure supplied to chamber 45 flows to chamber 53 to effect locking of the fulcrum pin 26 in the same manner as hereinbefore described in connection with Fig. 1. With the communication between chamber 45 and the brake cylinder 5 established, in the manner above described, fluid under pressure in chamber 45 flows to the brake cylinder device which device functions to effect an application of the brakes in the usual manner.

To initiate a release of the brakes, fluid under pressure is vented from the brake cylinder pipe 70 and consequently from the chambers 45 and 53 to the atmosphere. Since the brake cylinder device is in open communication with the chamber 45 fluid under pressure will be vented from the brake cylinder by way of pipes 88, hose 89, passage 87, ports 86 and chamber 45. This venting of fluid under pressure from the brake cylinder device 5 and chamber 53 will continue in the manner just described until the pressure of fluid in chamber 45 has been reduced sufficiently to permit the spring 50 to return the piston 38 to the position in which it is shown in the drawing. With the piston in this position, the final release of fluid under pressure from chamber 53 to the atmosphere is by way of passage 54, chamber 49 and passage 85 and from the brake cylinder device 5 by way of pipes 88, hose 89, passage 87, ports 86, chamber 49 and passage 85.

As hereinbefore described the release of fluid under pressure from the brake cylinder device 5, will effect a release of the brakes on the vehicle and the release of fluid under pressure from the chamber 53 will effect unlocking of the fulcrum lever 22 and thereby the fulcrum pin 26. With the brakes released and the fulcrum pin 26 unlocked, the spring 30 will return the fulcrum pin to the position in which it is shown in the drawing if the vehicle is empty. If the vehicle is loaded the fulcrum pin will be returned to the position called for by the weight of the lading carried.

Having now described our invention, what we claim as new and desire to secure by Letters Patent is:

1. In a variable load brake of the type comprising a brake lever system operative to effect an application and a release of the brakes, in combination, a fluid pressure responsive brake cylinder device for effecting the operation of said system, means associated with said system and operative for varying the leverage ratio of the system, a mechanism conditionable in accordance with the load carried by the vehicle and operative upon an increase in brake cylinder pressure for operating said means, and locking means controlled by said mechanism operative to lock said means in the position to which it has been actuated.

2. In a variable load brake of the type comprising a brake lever system operative to effect an application and a release of the brakes, in combination, a fluid pressure responsive brake cylinder device for effecting the operation of said system, means including a mechanism conditionable in accordance with the load carried by the vehicle and operative by variations in the pressure of fluid supplied to said brake cylinder for varying the leverage ratio of the system, locking means operative to lock said means in any position to which it has been actuated, and fluid pressure responsive means controlled by said means and operative by fluid under pressure supplied to said brake cylinder for effecting operation of said locking means.

3. In a vehicle variable load brake of the type comprising a brake lever system operative to effect an application and a release of the brakes, in combination, a fluid pressure responsive brake cylinder device carried by an unsprung part of the vehicle for effecting the operation of said system, means operative for varying the leverage ratio of the system, means conditioned in accordance with the load carried by the vehicle and operative by the pressure of fluid supplied to said brake cylinder for actuating the first mentioned means, the last mentioned means being carried by a sprung part of the vehicle and having a lost motion connection with the first mentioned means to accommodate vertical movement between said sprung and unsprung parts and to provide for the conditioning of the second mentioned means.

4. In a variable load brake apparatus for a vehicle of the type having a fixed part and a movable part said movable part being constructed and arranged for vertical movement relative to the fixed part in responsive to variations in the weight imposed thereon, in combination, a brake lever operatively connected to one end of a brake member to be operated, a brake cylinder connected to said lever and operative upon an increase in fluid under pressure supplied thereto to actuate the lever and thereby said member, a slotted opening in said lever extending longitudinally of the lever intermediate its ends, a fulcrum element for said lever disposed in said slotted opening, means carried by said fixed part of the vehicle for shifting said fulcrum element relative to said lever, and fluid pressure responsive means carried by the movable part of the vehicle and responsive to an increase in brake cylinder pressure for effecting movement of said means.

5. In a variable load brake apparatus for a vehicle of the type having a fixed part and a movable part said movable part constructed and arranged for vertical movement relative to the fixed part in response to variations in the weight imposed thereon, in combination, a brake lever operatively connected to one end of a brake member to be operated, a brake cylinder connected to said lever and operative upon an increase in fluid under pressure supplied thereto to actuate the lever and thereby said member, a slotted opening in said lever extending longitudinally of the lever intermediate its ends, a fulcrum element for said lever disposed in said slotted opening, adjusting means carried by said fixed part to shift said fulcrum element relative to said lever, locking means operative to lock said adjusting means and thereby said fulcrum element in its adjusted position, and fluid pressure responsive means carried by the movable part and responsive to an increase in brake cylinder pressure for effecting the operation of said adjusting means to shift said fulcrum element for effecting operation of said locking means to lock said adjusting means in the position to which it is shifted.

6. In a variable load brake apparatus for a vehicle of the type having a fixed part and a movable part said movable part constructed and arranged for vertical movement relative to the fixed part in response to variations in the weight imposed thereon, in combination, a brake lever operatively connected to one end of a brake member to be operated, a brake cylinder connected to said lever and operative upon an increase in fluid under pressure supplied thereto to actuate the lever and thereby said member, a slotted opening in said lever extending longitudinally of the lever intermediate its ends, a fulcrum element for said lever disposed in said slotted opening, a pin carried by said fixed part of the vehicle, a lever pivotally mounted at one end on said pin and rockable about the pin for shifting said fulcrum element relative to said brake lever, and fluid pressure responsive means carried by the movable part of the vehicle and operative by an increase in brake cylinder pressure for rocking the fulcrum shifting lever.

7. In a variable load brake apparatus for a vehicle of the type having a fixed part and a movable part said movable part being constructed and arranged for vertical movement relative to the fixed part in response to variations in the weight imposed thereon, in combination, a brake lever operatively connected to one end of a brake member to be operated, a brake cylinder connected to said lever and operative upon an increase in fluid under pressure supplied thereto to actuate the lever and thereby said member, a slotted opening in said lever extending longitudinally of the lever intermediate its ends, a fulcrum element for said lever disposed in said slotted opening, a pin carried by said fixed part of the vehicle, a lever pivotally mounted at one end on said pin and rockable about the pin for shifting said fulcrum element relative to said brake lever, a toothed bar operatively connected to the opposite end of said lever, a slidably mounted member for movement into locking engagement with said bar, and fluid pressure responsive means operative upon an increase in brake cylinder pressure for rocking said lever and for then actuating said slidably mounted member into locking engagement with said bar.

8. In a variable load brake apparatus for a vehicle of the type having a fixed part and movable part said movable part being constructed and arranged for vertical movement relative to the fixed part in response to variations in the weight imposed thereon, in combination, a brake lever operatively connected to one end of a brake member to be operated, a brake cylinder connected to said lever and operative upon an increase in fluid under pressure supplied thereto to actuate the lever and thereby said member, a slotted opening in said lever extending longitudinally of the lever intermediate its ends, a fulcrum element for said lever disposed in said slotted opening, a pin carried by said fixed part of the vehicle, a lever pivotally mounted at one end on said pin and rockable about the pin for shifting said fulcrum element relative to said brake lever, a toothed bar operatively connected to the opposite end of said lever, slidably mounted member for movement into locking engagement with said bar, and fluid pressure responsive means operative upon a relatively slight increase in brake cylinder pressure for rocking said lever and upon a predetermined higher increase in brake cylinder pressure, for actuating said slidably mounted member into locking engagement with said bar.

9. In a variable load brake apparatus for a vehicle of the type having a fixed part and a movable part, said movable part being constructed and arranged for vertical movement relative to the fixed part in response to variations in the weight imposed thereon, in combination, a brake lever operatively connected to one end of a brake member to be operated, a brake cylinder connected to the other end of said brake lever to actuate the lever and thereby said member, a slotted opening in said lever extending longitudinally of the lever intermediate its ends, a fulcrum element for said lever movably mounted in said slotted opening, fulcrum element adjusting means carried by said fixed part of the vehicle for shifting said fulcrum relative to said brake lever, a brake cylinder pipe normally deplete of fluid under pressure and through which fluid under pressure may be supplied to effect operation of said brake cylinder, and fluid pressure means responsive to an increase in the pressure of fluid in said pipe, to a value less than that required to effect operation of said brake cylinder, for shifting said fulcrum adjusting means.

10. In a variable load brake apparatus for a vehicle of the type having a fixed part and a movable part said movable part being constructed and arranged for vertical movement relative to the fixed part in response to variations in the weight imposed thereon, in combination, a brake lever operatively connected to one end of a brake member to be operated, a brake cylinder connected to the other end of said brake lever to actuate the lever and thereby said member, a slotted opening in said lever extending longitudinally of the lever intermediate its ends, a fulcrum element for said lever movably mounted in said slotted opening, fulcrum element adjusting means carried by said fixed part of the vehicle for shifting said fulcrum relative to said brake lever, locking means for locking said fulcrum element adjusting means in its adjusted position, a brake cylinder pipe normally deplete of fluid under pressure and through which fluid under pressure may be supplied to effect operation of said brake cylinder, and fluid pressure responsive means operative upon an increase in pressure of fluid in said pipe, to a value less than that required to effect operation of said brake cylinder, for first shifting said fulcrum adjusting means and for then locking the fulcrum adjusting means in its adjusted position.

11. In a variable load brake apparatus for a vehicle, a brake lever operative for effecting an application of the vehicle brakes, a brake cylinder for actuating said brake lever upon a predetermined increase in fluid under pressure, an adjustable fulcrum for said lever having a position for empty vehicle braking and being movable therefrom to various other positions through a loaded vehicle zone for providing loaded vehicle braking, means for normally maintaining said adjustable fulcrum in the position for empty vehicle braking, fluid pressure responsive means for positioning said adjustable fulcrum means in said loaded vehicle zone in accordance with the load carried by the vehicle, said fluid pressure responsive means being operative by fluid under pressure at a pressure below said predetermined degree, and a communication common to said brake cylinder and fluid pressure responsive means through which fluid under pressure is supplied simultaneously to both the brake cylinder and the fluid pressure responsive means.

12. In a variable load brake apparatus for a vehicle, a brake lever operative for effecting an application of the vehicle brakes, a brake cylinder operative by fluid under pressure supplied thereto for actuating said lever, adjustable fulcrum means for said lever having a position for empty vehicle braking and being movable therefrom to various other positions through a loaded vehicle zone for providing loaded vehicle braking, spring means for normally maintaining said adjustable fulcrum in the position for empty vehicle braking, a lever pivotally mounted on an unsprung part of the vehicle truck operative to position said adjustable fulcrum means in accordance with the load carried by the vehicle, locking means for locking said lever and thereby said fulcrum in any adjusted position, and fluid pressure responsive means operative by an increase in fluid under pressure for controlling the operation of said lever, said locking means and the supply of fluid under pressure to said brake cylinder.

13. In a variable load brake apparatus for a vehicle, a brake lever operative for effecting an application of the vehicle brakes, a brake cylinder operative by fluid under pressure supplied thereto for actuating said lever, adjustable fulcrum means for said lever having a position for empty vehicle braking and being movable therefrom to various other positions through a loaded vehicle zone for providing loaded vehicle braking, spring means for normally maintaining said adjustable fulcrum in the position for empty vehicle braking, and fluid pressure responsive means for positioning said adjustable fulcrum means in said loaded vehicle zone in accordance with the load carried by the vehicle, said fluid pressure responsive means being operative upon an increase in fluid under pressure supplied thereto for first positioning said adjustable fulcrum means and for then supplying fluid under pressure to said brake cylinder.

14. In a variable load brake apparatus for a vehicle, a brake lever operative for effecting an application of the vehicle brakes, a brake cylinder operative by fluid under pressure supplied thereto for actuating said lever, adjustable fulcrum means for said lever having a position for empty vehicle braking and being movable therefrom to various other positions through a loaded vehicle zone for providing loaded vehicle braking, locking means for locking said adjustable fulcrum means in its adjusted position, a pipe through which fluid under pressure is adapted to be supplied to said brake cylinder, and means interposed in said pipe and responsive to an increase in the pressure of fluid in said pipe for preventing the flow of fluid under pressure to said brake cylinder until after said adjustable fulcrum means is positioned and locked in its adjusted position.

15. In a variable load brake apparatus for a vehicle of the type having a fixed part and a movable part constructed and arranged for vertical movement relative to the fixed part in response to variations in the weight imposed thereon, in combination, a brake lever operatively connected to one end of a brake member to be operated, a brake cylinder connected to the other end of said lever and operative upon an increase in fluid under pressure supplied thereto to actuate the lever and thereby said member, a slotted opening in said lever extending longitudinally of the lever intermediate its ends, a fulcrum element for said lever disposed in said slotted opening, means carried by said fixed part for shifting said fulcrum element along said lever, and fluid pressure responsive means carried by the movable part and having a lost motion connection with the means for shifting said fulcrum element, said fluid pressure responsive means being operative by fluid under pressure supplied to the brake cylinder for actuating said means for shifting said adjustable fulcrum means only upon relative movement between said fixed and said movable parts of the vehicle.

16. In a variable load brake apparatus for a vehicle of the type having a fixed part and a movable part constructed and arranged for vertical movement relative to the fixed part in response to variations in the weight imposed thereon, in combination, a brake lever operatively connected to one end of a brake member to be operated, a brake cylinder connected to the other end of said lever and operative upon an increase in fluid under pressure supplied thereto to actuate the lever and thereby said member, a slotted opening in said lever extending longitudinally of the lever intermediate its ends, a fulcrum element for said lever disposed in said slotted opening, a lever pivotally mounted on said fixed part of the vehicle for shifting said fulcrum element along said brake lever, fluid pressure responsive means carried by the movable part of the vehicle, said fluid pressure responsive means including a piston and a stem operative relative to said lever by fluid under pressure supplied thereto, and a lost motion connection between said stem and said lever operative by movement of the piston and stem relative to the lever to actuate said lever only upon relative movement between said fixed and said movable parts of the vehicle.

SIDNEY G. DOWN.
CLYDE C. FARMER.